United States Patent
Grothe et al.

[11] Patent Number: 5,678,518
[45] Date of Patent: Oct. 21, 1997

[54] AUXILIARY STARTER, PARTICULARLY FOR DIESEL ENGINES

[75] Inventors: Wolfgang Grothe, Tiefenbronn; Werner Gruenwald, Gerlingen, both of Germany

[73] Assignee: Robert Bosch GmbH, Stuttgart, Germany

[21] Appl. No.: 619,703
[22] PCT Filed: Aug. 3, 1995
[86] PCT No.: PCT/DE95/01010
§ 371 Date: Mar. 26, 1996
§ 102(e) Date: Mar. 26, 1996
[87] PCT Pub. No.: WO96/07823
PCT Pub. Date: Mar. 14, 1996

[30] Foreign Application Priority Data

Sep. 3, 1994 [DE] Germany .................. 44 31 477.9

[51] Int. Cl.⁶ .................. F02P 19/02; F23Q 7/00; F02N 17/08
[52] U.S. Cl. .................. 123/298; 123/143 B; 123/260; 123/585
[58] Field of Search .................. 123/298, 143 B, 123/536, 585, 260, 145 A, 438, 571

[56] References Cited

U.S. PATENT DOCUMENTS

| | | | |
|---|---|---|---|
| 4,189,355 | 2/1980 | Fujishiro et al. | 123/571 |
| 4,212,273 | 7/1980 | Maruoka | 123/438 |
| 4,340,019 | 7/1982 | Barnert et al. | 123/260 |
| 4,487,177 | 12/1984 | Ishikawa | 123/260 |

*Primary Examiner*—Marguerite McMahon
*Attorney, Agent, or Firm*—Spencer & Frank

[57] ABSTRACT

Proposed is an auxiliary starter, particularly for a diesel engine, having an auxiliary starting device (16) which is disposed in a combustion chamber or in an intake pipe and brings an injection stream of a fuel introduced into the combustion chamber or the intake pipe into an ignitable state. The auxiliary starting device (16) is an oxygen pump cell (18) which operates on the basis of an oxygen-ion-conducting solid electrolyte, and with which oxygen is pumped into at least the edge zone of the injection stream (15).

10 Claims, 2 Drawing Sheets

AUXILIARY STARTER, PARTICULARLY FOR DIESEL ENGINES

STATE OF THE ART

The invention relates to an auxiliary starter, particularly for diesel engines, according to the generic type disclosed in the main claim.

Different auxiliary starting devices are known for starting cold diesel engines, such as sheathed element glow plugs or flame plugs. The auxiliary starting devices are disposed in the combustion chamber or in the intake pipe of diesel engines, and bring the diesel fuel introduced into the intake pipe by way of an injection stream to ignition. In sheathed element glow plugs, the ignition temperature is attained by an electrically-heated glow plug whose temperature can be above 1000° C.

ADVANTAGES OF THE INVENTION

In contrast, the auxiliary starter of the invention having the characterizing features of the main claim has the advantage that the ignition temperature can be lowered and, at the same time, easier ignition of the fuel-air mixture is possible. Consequently, the engine has a more uniform run-up behavior during a cold start.

BRIEF DESCRIPTION OF THE PREFERRED EMBODIMENTS

An embodiment of the invention is illustrated in the drawing and explained in detail in the following description.

FIG. 1 shows a combustion chamber having a precombustion chamber of a diesel engine, FIG. 2 shows an oxygen pump cell having a finger construction, FIG. 3 shows an oxygen pump cell having a solid-electrolyte body and FIG. 4 shows a cross-section through the solid-electrolyte body according to FIG. 3.

DETAILED DESCRIPTION OF THE PREFERRED EMBODIMENTS

Figure 1:
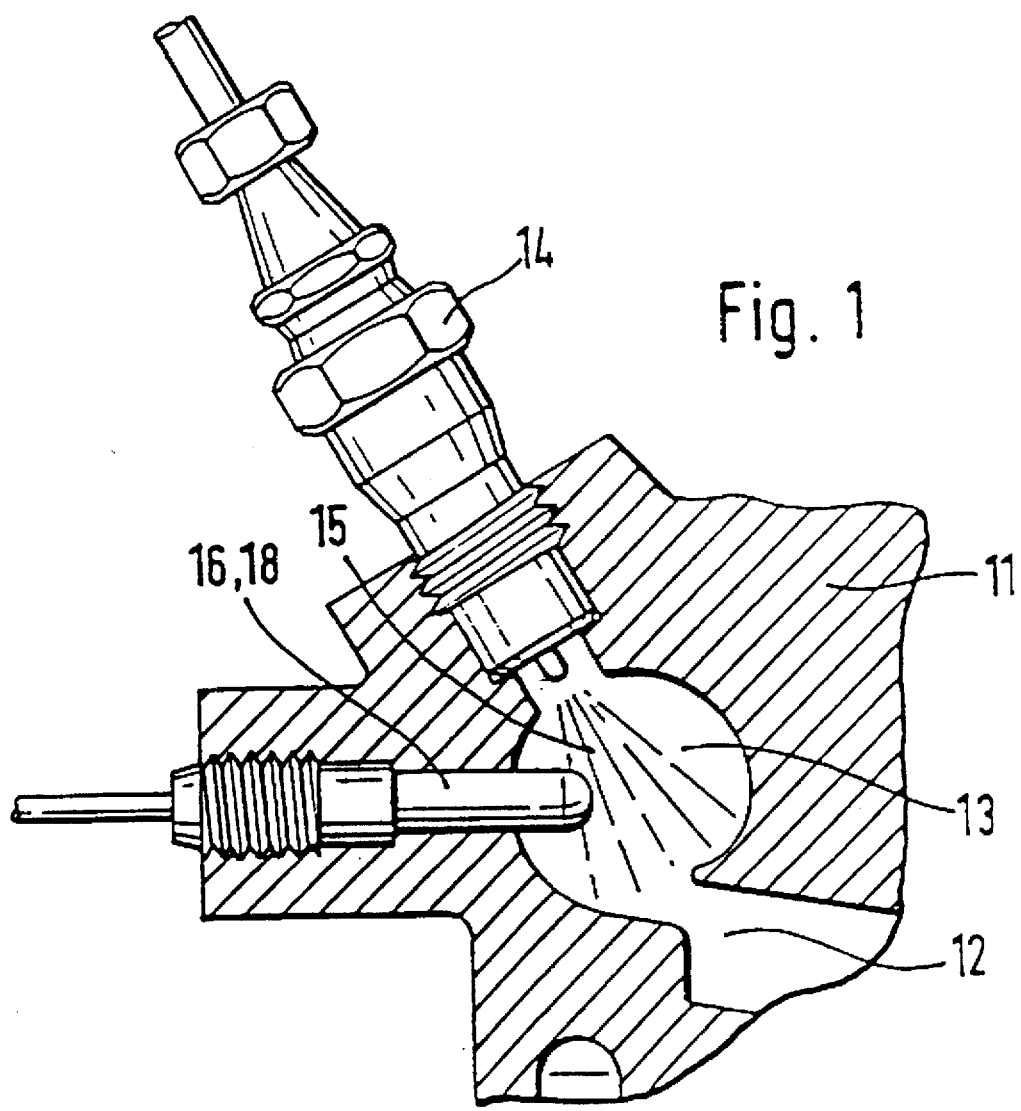

A diesel engine having an engine block 11 includes a combustion chamber 12 having a precombustion chamber 13. An injection valve 14 having an injection stream 15 is inserted into the engine block 11 in such a way that the injection stream 15 is guided into the precombustion chamber 13. An auxiliary starting device 16 is further positioned in the precombustion chamber 13 such that it extends into the edge zone of the injection stream 15.

Figure 2:
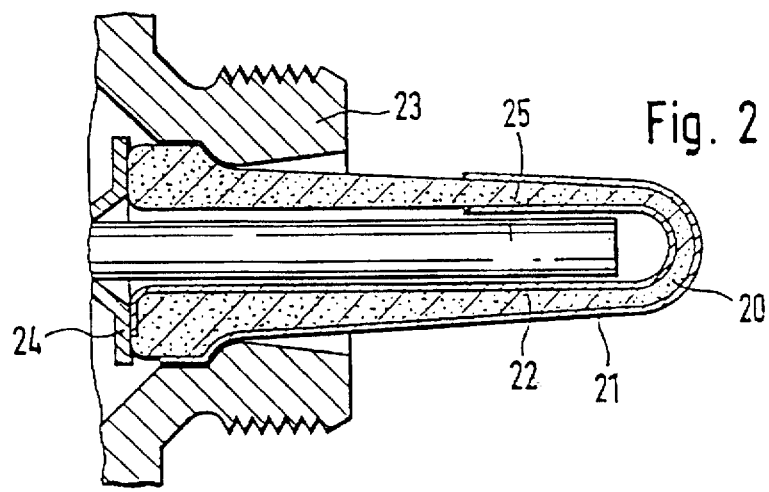

The auxiliary starting device 16 is an oxygen pump cell 18 which operates on the basis of an oxygen-ion-conducting solid electrolyte. Zirconium dioxide stabilized with $Y_2O_3$, for example, is used as the solid-electrolyte ceramic. In accordance with FIG. 2, the solid-electrolyte ceramic can comprise a tubular solid-electrolyte body 20 which is closed on one side and has a finger construction, or, in accordance with FIGS. 3 and 4, it can be configured as a wafer-shaped solid-electrolyte body 30.

The tubular solid-electrolyte body 20 according to FIG. 1 is inserted into a metallic housing 23, and has a first electrode 21 on its outside surface and a second electrode 22 on its inside surface. The electrodes 21, 22 are provided with conductor paths, with the electrode 21 being contacted with the housing 23 and the electrode 22 being contacted with a contact part 24. A rod-shaped heating element 25 is disposed inside the solid-electrolyte body 20.

Figure 3:
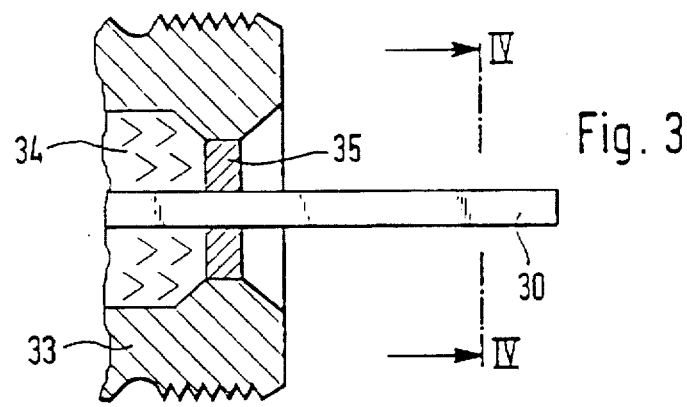
Figure 4:
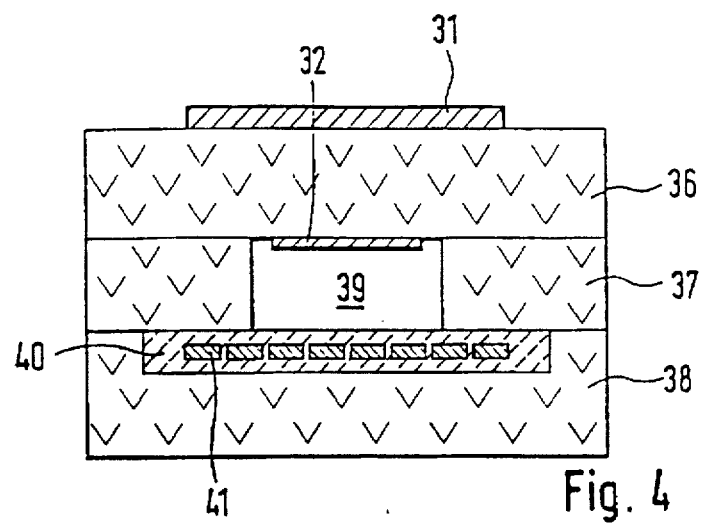

The wafer-shaped solid-electrolyte body 30 according to FIG. 3 is likewise secured in a metallic housing 33 with holding means 34 and sealing means 35. The solid-electrolyte body 30 according to FIG. 4 comprises, for example, a first solid-electrolyte film 36, a second solid-electrolyte film 37 and a third solid-electrolyte film 38. A channel 39 which is open on the side of the housing and is connected to the atmosphere is stamped into the second solid-electrolyte film 37. The channel 39 is closed at the end on the side of the injection stream. An external, first electrode 31 is disposed on the first solid-electrolyte film 36, and a second electrode 32 is positioned in the channel 39. A heater 41 is embedded into an electrical insulation 40 in the third solid-electrolyte film 38.

The heater element 25 of the tubular solid-electrolyte body 20 and the heater 41 of the wafer-shaped solid-electrolyte body 30 serve to bring the ceramic of the solid-electrolyte bodies to the appropriate operating temperature necessary for creating a conduction of oxygen ions. The oxygen-ion conduction and therefore the oxygen transport are already established at a temperature of approximately 300° C. It is useful simultaneously to use the heating devices 25, 41 to bring the fuel/air mixture to the ignition temperature A pumping voltage of, for example, 800 mV is applied to the electrodes 21 and 22 of the tubular solid-body electrolyte 20 according to FIG. 2 and the electrodes 31, 32 of the wafer-shaped solid-electrolyte body 30 according to FIGS. 3 and 4, with the pumping voltage being polarized such that the electrodes 21, 31 pointing into the precombustion chamber 13 are respectively switched as an anode and the electrodes 22, 32 connected to the atmosphere are respectively switched as a cathode. Consequently, molecular oxygen from the atmosphere travels from the electrode 22, 32 switched as a cathode to the electrode 21, 31 switched as an anode with the utilization of the oxygen pump phenomenon in solid-electrolyte-body ceramics. As a result, the oxygen exits at the electrodes 21, 31 and, in front of the hot anode, the diesel vapor present in the injection stream 15 can react, in a small volume, with the oxygen enriched there. Because of the high oxygen concentration present in this zone, the ignition of the fuel/air mixture is initiated from this zone.

We claim:

1. Auxiliary starter, particularly for a diesel engine, having a starting device which is disposed in a combustion chamber or in an intake pipe and brings an injection stream of a fuel introduced into the combustion chamber or the intake pipe into an ignitable state, characterized by an oxygen pump cell (18) which operates on the basis of an oxygen-ion-conducting solid electrolyte, and with which oxygen is pumped into at least the edge zone of the injection stream (15).

2. Auxiliary starter according to claim 1, characterized in that the pump cell (18) has a first electrode (21, 31) and a second electrode (22, 32), wherein at least one of the electrodes (21, 31) is located in the region of the injection stream (15) and a pumping voltage is applied to the electrodes (21, 22, 31, 32) in such a way that oxygen is pumped from the one electrode to the electrode disposed in the injection stream (15).

3. Auxiliary starter according to claim 2, characterized in that the other electrode (22, 32) is connected to the atmosphere, so that oxygen is pumped from the atmosphere into the combustion chamber (12, 13).

4. Auxiliary starter according to claim 3, characterized in that the pump cell (18) has a tubular solid-electrolyte body (20) which is closed on the side of the injection stream and is connected by its open end to the atmosphere.

5. Auxiliary starter according to claim 2, characterized in that the pump cell (18) has a wafer-shaped solid-electrolyte body (30) in which the one electrode (31) is disposed in the injection stream (15) and the other electrode (32) is disposed so as to face away from the injection stream (15) on the wafer-shaped solid-electrolyte body (30).

6. Auxiliary starter according to claim 5, characterized in that the solid-electrolyte body (30) has a channel (39) which is connected to the atmosphere and in which the other electrode (32) is disposed.

7. Auxiliary starter according to claim 4, characterized in that the solid-electrolyte body (20, 30) comprises stabilized $ZrO_2$.

8. Auxiliary starting device according to claim 1, characterized in that the pump cell (18) has a heating device (25, 41) with which both the operating temperature of the pump cell (18) and the ignition temperature of the fuel in the injection stream (15) can be set.

9. Auxiliary starter according to claim 5, characterized in that the solid-electrolyte body (20, 30) comprises stabilized $ZrO_2$.

10. Auxiliary starter according to claim 6, characterized in that the solid-electrolyte body (20, 30) comprises stabilized $ZrO_2$.

* * * * *